US011664966B2

(12) United States Patent
Zhang et al.

(10) Patent No.: US 11,664,966 B2
(45) Date of Patent: May 30, 2023

(54) CO-FREQUENCY CO-TIME FULL DUPLEX (CCFD) SIGNAL RECEIVING METHOD

(71) Applicant: ZHEJIANG LAB, Hangzhou (CN)

(72) Inventors: Changming Zhang, Hangzhou (CN); Xianbin Yu, Hangzhou (CN); Xuemin Li, Hangzhou (CN); Jie Shen, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/075,430

(22) Filed: Dec. 6, 2022

(65) Prior Publication Data

US 2023/0096059 A1    Mar. 30, 2023

Related U.S. Application Data

(63) Continuation of application No. PCT/CN2022/079387, filed on Mar. 4, 2022.

(30) Foreign Application Priority Data

May 25, 2021 (CN) .......................... 202110572937.6

(51) Int. Cl.
*H04L 5/14* (2006.01)
(52) U.S. Cl.
CPC .................................. *H04L 5/1461* (2013.01)
(58) Field of Classification Search
None
See application file for complete search history.

(56) References Cited

U.S. PATENT DOCUMENTS

2007/0248191 A1* 10/2007 Pettersson ............ H04B 1/7115
375/E1.032
2010/0159865 A1* 6/2010 Fudge .................. H04B 1/1036
455/296

(Continued)

FOREIGN PATENT DOCUMENTS

CN    103634022 A    3/2014
CN    103957182 A    7/2014

(Continued)

OTHER PUBLICATIONS

Changming Zhang, et al., Adaptive Digital Self-Interference Cancellation for Millimeter-Wave Full-Duplex Backhaul Systems, IEEE Access, 2019, pp. 175542-175553, vol. 7.

(Continued)

*Primary Examiner* — Benjamin Lamont
(74) *Attorney, Agent, or Firm* — Bayramoglu Law Offices LLC

(57) ABSTRACT

A co-frequency co-time full duplex (CCFD) signal receiving method includes: taking the sent baseband signal as the self-interference reference signal, reconstructing self-interference, and then performing primary self-interference cancellation on the received signal; processing, by using a timing synchronization loop, the signal after the primary self-interference cancellation, realizing timing recovery at the optimal sampling point of the useful signal through resampling a, and controlling resampling b1 and resampling b2 after performing low-pass filtering on the timing error signal in the timing synchronization loop, to recover the optimal sampling points of the self-interference reference signal and the received signal respectively; and performing joint self-interference cancellation and equalization on the resampled self-interference reference signal and the resampled received signal, and receiving the useful signal through signal demodulation. The above method can sig- (Continued)

nificantly enhance the self-interference cancellation capability of CCFD technology and improve the receiving performance of the useful signal.

7 Claims, 7 Drawing Sheets

(56) References Cited

U.S. PATENT DOCUMENTS

| | | | |
|---|---|---|---|
| 2014/0348018 A1 | 11/2014 | Bharadia et al. | |
| 2016/0056946 A1 | 2/2016 | Moher | |
| 2016/0359552 A1 | 12/2016 | Monsen et al. | |
| 2017/0214512 A1* | 7/2017 | Hu | H04B 1/44 |
| 2019/0199392 A1* | 6/2019 | Kim | H04L 5/14 |

FOREIGN PATENT DOCUMENTS

| | | |
|---|---|---|
| CN | 105245246 A | 1/2016 |
| CN | 105634539 A | 6/2016 |
| CN | 111107027 A | 5/2020 |
| CN | 111131099 A | 5/2020 |
| CN | 111245761 A | 6/2020 |
| CN | 111726306 A | 9/2020 |
| CN | 113315531 A | 8/2021 |
| KR | 100909356 B1 | 7/2009 |
| WO | 9516312 A1 | 6/1995 |

OTHER PUBLICATIONS

Liu Heng, Research on vector analysis technology and interference elimination reception technology in wireless communication system, Southwest Jiaotong University Master's Thesis, 2008, pp. 1-59.

* cited by examiner

CO-FREQUENCY CO-TIME FULL DUPLEX (CCFD) SIGNAL RECEIVING METHOD

CROSS REFERENCE TO THE RELATED APPLICATIONS

This application is the continuation application of International Application No. PCT/CN2022/079387, filed on Mar. 4, 2022, which is based upon and claims priority to Chinese Patent Application No. 202110572937.6, filed on May 25, 2021, the entire contents of which are incorporated herein by reference.

TECHNICAL FIELD

The present disclosure relates to the field of wireless communication and signal processing, and more specifically, to a co-frequency co-time full duplex (CCFD) signal receiving method.

BACKGROUND

In CCFD technology, transmitting and receiving links of a device work in the same time slot and same frequency band. Compared with existing half-duplex technologies (including time division duplex and frequency division duplex), the CCFD technology can theoretically improve spectrum efficiency by 100%. With the increasing shortage of spectrum resources and increasing demand for the wireless transmission rate, the CCFD technology has become one of core technologies of B5G/6G and has received extensive attention from the academia and industry. However, the CCFD technology faces prominent self-interference whose power may far exceed the power of useful signal, and it is difficult to ideally cancel the self-interference. For this reason, performance indicators of prototypes developed by various research institutions and enterprises cannot meet market application requirements yet, and the improvement of the spectrum efficiency is still far from the ideal value.

FIG. 1 is a schematic structural diagram of CCFD transceiver. After baseband processing, a signal at the transmitter is converted into analog domain from digital domain by a digital-to-analog converter (DAC), the frequency of the analog signal is shifted to the required frequency band by a frequency mixer, and then the analog signal is amplified by a power amplifier (PA) and sent via an antenna. A part of the sent signal enters the receiver through antenna leakage or environment reflection and scattering, to form a self-interference signal aliased with the received useful signal. After being amplified by a low-noise amplifier (LNA), the signal received from the antenna is jointly processed by a frequency mixer and a filter to obtain the corresponding analog baseband signal. The analog baseband signal is sampled by an analog-to-digital converter (ADC) to obtain the digital signal that enters the receiving baseband. The sent baseband signal also enters the receiving baseband as the self-interference reference signal and is used to reconstruct the self-interference signal and realize self-interference cancellation. The self-interference cancellation can also be realized in the antenna domain or the radio frequency (RF) domain in addition to the receiving baseband. However, the antenna domain or the RF domain has limited self-interference cancellation capabilities, and the performance of receiver is mainly guaranteed by the self-interference cancellation of the baseband. The present disclosure will provide an innovative signal receiving process of the baseband part. In addition, the transmitter and the receiver in FIG. 1 adopt the same local oscillator, namely a structure sharing a common local oscillator, to realize spectrum shifting. In an actual system, independent local oscillators can also be used, but the structure sharing the local oscillator can avoid a great adverse effect caused by phase noise.

The existing CCFD technology usually performs self-interference cancellation and receiving of the useful signal separately, as shown in FIG. 2. The self-interference reference signal is used to reconstruct the self-interference signal, and then the reconstruction result is subtracted from the received signal to realize self-interference cancellation. Self-interference reconstruction is generally completed by a self-adaptive manner, such as least mean square (LMS) algorithm, recursive least square (RLS) algorithm, or frequency-domain block least mean square (FBLMS) algorithm. Then, the self-interference cancellation result is regarded as the useful signal, and resampling is performed at an optimal sampling point of the useful signal by using a timing synchronization loop. The timing synchronization loop includes resampling, timing error extraction, loop filtering, and processing of a numerical controlled oscillator (NCO). Finally, equalization and demodulation are performed on the resampled signal, such that the receiving process of the useful signal is completed. Driven by the demodulation error, equalization is generally completed self-adaptively. Herein, during self-interference cancellation, the self-interference reference signal, and the self-interference part of the received signal are from a local device, and the clock information has been aligned, so timing synchronization is omitted. The useful signal after the self-interference cancellation is from an opposite-end device, and the clock frequency of the opposite-end device may deviate from that of the local device. Therefore, it is necessary to recover resampling at the optimal sampling point through timing synchronization.

The main problem of the existing technical solution is a poor self-interference cancellation capability. The signal after the self-interference cancellation includes residual self-interference, the useful signal, and noise, which are jointly used as a driving signal for self-adaptive self-interference reconstruction. However, the residual self-interference is the only required driving signal, so the useful signal and the noise have an adverse effect on the self-interference cancellation. Due to the existence of the useful signal, it is difficult to control the residual self-interference to a negligible level. Therefore, if the cancellation result is directly regarded as the useful signal, the sensitivity of the receiver is significantly deteriorated compared with that in a half-duplex system. In addition, in case of the poor self-interference cancellation capability, the timing synchronization loop is also affected by the residual self-interference. Although the self-interference cancellation effect can be improved to a certain extent by reducing the step size factor of self-adaptive adjustment, the convergence speed may be greatly reduced. In view of the above problems, the present disclosure is intended to design a new CCFD signal receiving method to enhance the self-interference cancellation capability, improve the demodulation performance of the useful signal, and promote the application of the CCFD technology.

SUMMARY

The present disclosure is intended to provide a CCFD signal receiving method to enhance the self-interference cancellation capability and improve the receiving performance of useful signal.

To achieve the above objective, the present disclosure adopts the following technical solutions:

A CCFD signal receiving method includes the following steps:

step 1: taking the sent baseband signal as a self-interference reference signal, reconstructing self-interference self-adaptively, and subtracting the self-interference from the received signal to realize primary self-interference cancellation;

step 2: processing, by using a timing synchronization loop, the signal after the primary self-interference cancellation, realizing timing recovery at the optimal sampling point of the useful signal through resampling a, and controlling resampling b1 and resampling b2 after performing low-pass filtering on the timing error signal in the timing synchronization loop, to recover optimal sampling points of the self-interference reference signal and the received signal respectively; and step 3: performing joint self-interference cancellation and equalization on the resampled self-interference reference signal and the resampled received signal and receiving the useful signal through signal demodulation.

Further, the primary self-interference cancellation is performed by using a self-adaptive algorithm such as LMS, RLS, or FBLMS.

Further, the timing synchronization loop includes resampling a, timing error extraction, loop filtering, and processing of NCO; and a resampled signal is subjected to the timing error extraction to output the timing error signal, and then the timing error signal is fed back to resampling a after the loop filtering and the processing of NCO.

Further, the loop filtering is performed by a proportional-integrate (PI) control filter.

Further, the timing error signal is first smoothed through the low-pass filtering and processed by the NCO, and then used to control resampling b1 of the self-interference reference signal and resampling b2 of the received signal.

Further, the low-pass filtering is performed by branch I of the PI control filter.

Further, the joint self-interference cancellation and equalization is completed under the driving of demodulation error.

Further, the joint self-interference cancellation is performed by using a self-adaptive algorithm such as LMS, RLS, or FBLMS.

Further, the demodulation error is the decision error, and includes residual self-interference, equalization error, and noise.

Compared with the prior art, the present disclosure has the following advantages:

(1) In the traditional method, the signal after the self-interference cancellation is used as the driving signal for self-adaptive self-interference reconstruction, and includes the residual self-interference, the useful signal, and the noise. However, the required driving signal is only the residual self-interference, so the useful signal and the noise have an adverse effect on the self-interference cancellation. Moreover, the power of the useful signal is far greater than that of the noise, which is a main factor restricting the self-interference cancellation capability. The CCFD signal receiving method in the present disclosure divides the self-interference cancellation into two stages: primary self-interference cancellation and joint self-interference cancellation and equalization. The primary self-interference cancellation provides support for timing synchronization of the joint self-interference cancellation and equalization.

Different from the existing technical solution, the primary self-interference cancellation in the present disclosure does not require a strong self-interference cancellation capability, and the corresponding cancellation result only provides a reference input for the timing synchronization and does not serve as the input for equalization and demodulation of the useful signal. Therefore, it is only necessary to ensure that the useful signal is dominant after the primary self-interference cancellation, and the timing synchronization can realize the timing recovery at the optimal sampling point of the useful signal, thereby greatly alleviating implementation pressure of the primary self-interference cancellation.

Compared with the existing technical solution, the present disclosure jointly performs self-interference cancellation and equalization of the useful signal, in other words, performs the joint self-interference cancellation and equalization under the driving of the demodulation error, which can prevent the useful signal from affecting the self-interference cancellation, thereby enhancing the self-interference cancellation capability and improving the receiving performance of the useful signal.

(2) A performance test of the self-interference cancellation and a performance test of the mean square error (MSE) of demodulating the useful signal verify that the present disclosure can effectively prevent the useful signal from affecting the self-interference cancellation, and in all cases, the amount of canceled self-interference in the present disclosure is greater than that in the existing technical solution, and the self-interference cancellation capability is stronger. In addition, the MSE in the technical solutions of the present disclosure is less than that in the existing technical solution in all cases, thereby achieving a better receiving performance on the useful signal.

(3) Based on the traditional timing synchronization loop, the present disclosure performs low-pass filtering with a smaller bandwidth ratio than the loop filtering on the timing error extraction result, and then controls the resampling of the self-interference reference signal and the received signal after the processing of NCO. On one hand, due to the smoothing effect of the low-pass filtering, the accuracy of timing error information can be improved, thereby improving the timing synchronization performance of the self-interference reference signal and the received signal. On the other hand, the low-pass filtering is excluded in the timing synchronization loop and does not adversely affect the convergence speed of the loop, and the low-pass filtering can be directly performed by branch I of the loop filtering, without the requirement to build an additional low-pass filter.

(4) A test on timing synchronization resampling verifies that the peak resampling error value in the technical solutions of the present disclosure is one order of magnitude lower than that in the existing technical solution, thereby fully ensuring the use of a high-order modulation mode sensitive to the resampling error and achieving negligible self-interference after cancellation.

DETAILED DESCRIPTION OF THE EMBODIMENTS

The following further describes the present disclosure in detail with reference to the accompanying drawings and embodiments.

Figure 3:
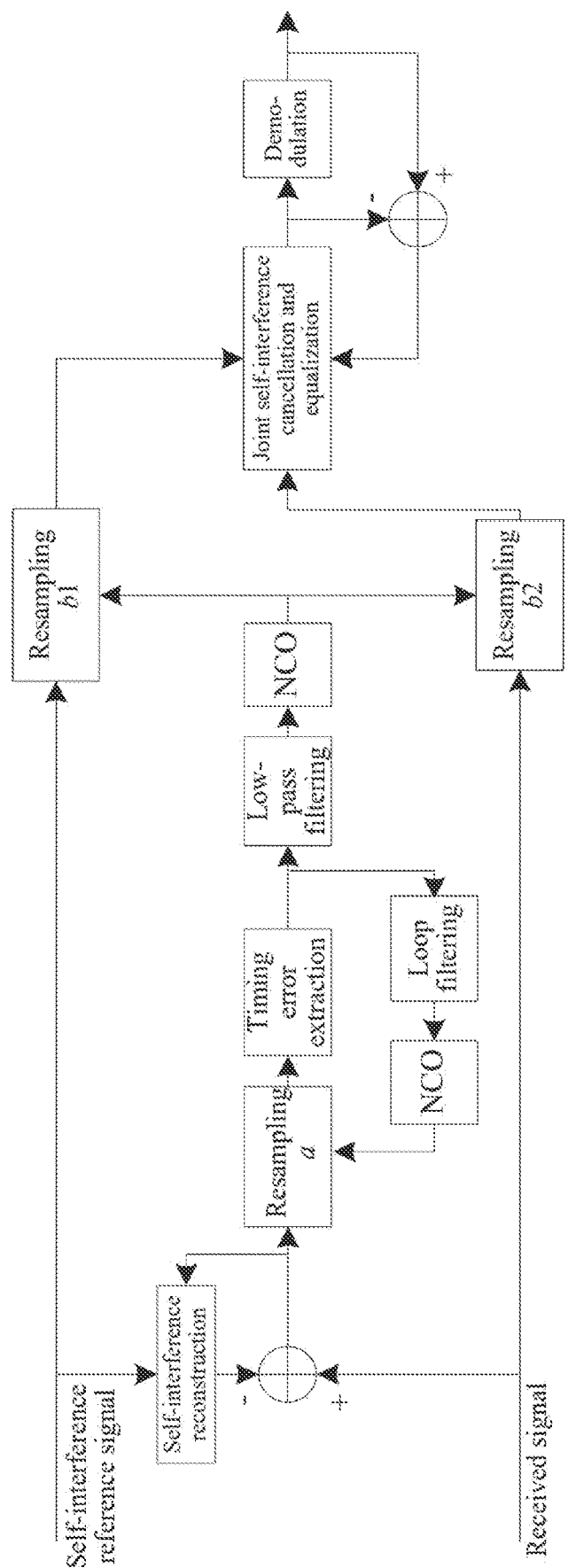
FIG. 3 is a block diagram of the implementation of CCFD receiving according to the present disclosure.

Based on the self-interference reference signal and the received signal, the present disclosure jointly performs self-interference cancellation and equalization on the useful signal and uses the demodulation error of the useful signal to drive the entire joint self-adaptive process. Therefore, the demodulation error does not contain the useful signal after convergence, so this signal receiving method can prevent the useful signal from restricting the self-interference cancellation capability. In the joint self-interference cancellation and equalization, clocks of the self-interference reference signal and the received signal need to be aligned to the optimal sampling point of the useful signal, such that the useful signal can be correctly demodulated. However, in the self-interference reference signal and the received signal, the useful signal is not a main part, and it is impossible to realize timing recovery at the optimal sampling point of the useful signal after extracting a timing error from the self-interference reference signal and the received signal. For this purpose, the present disclosure first performs primary self-interference cancellation, extracts the timing error from the result of the primary self-interference cancellation to control resampling of the self-interference reference signal and the received signal, so as to realize the timing recovery at the optimal sampling point of the useful signal, and then performs the joint self-interference cancellation and equalization on the resampled self-interference reference signal and the resampled received signal. An implementation is shown in FIG. 3. Specific steps are as follows:

Step 1: A sent baseband signal is taken as a self-interference reference signal, self-interference is reconstructed self-adaptively, and the self-interference is subtracted from the received signal to realize primary self-interference cancellation.

Figure 1:
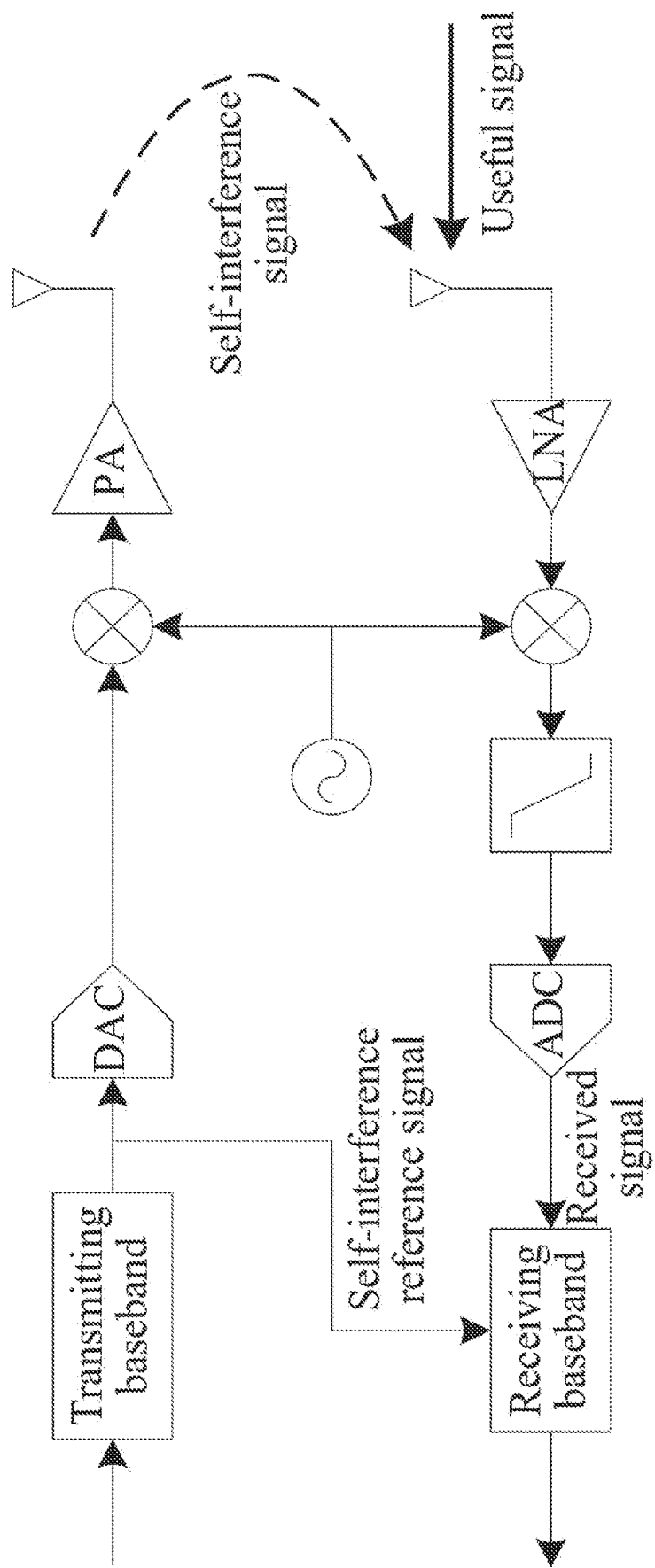
FIG. 1 is a schematic structural diagram of the CCFD communication transceiver.
Figure 2:
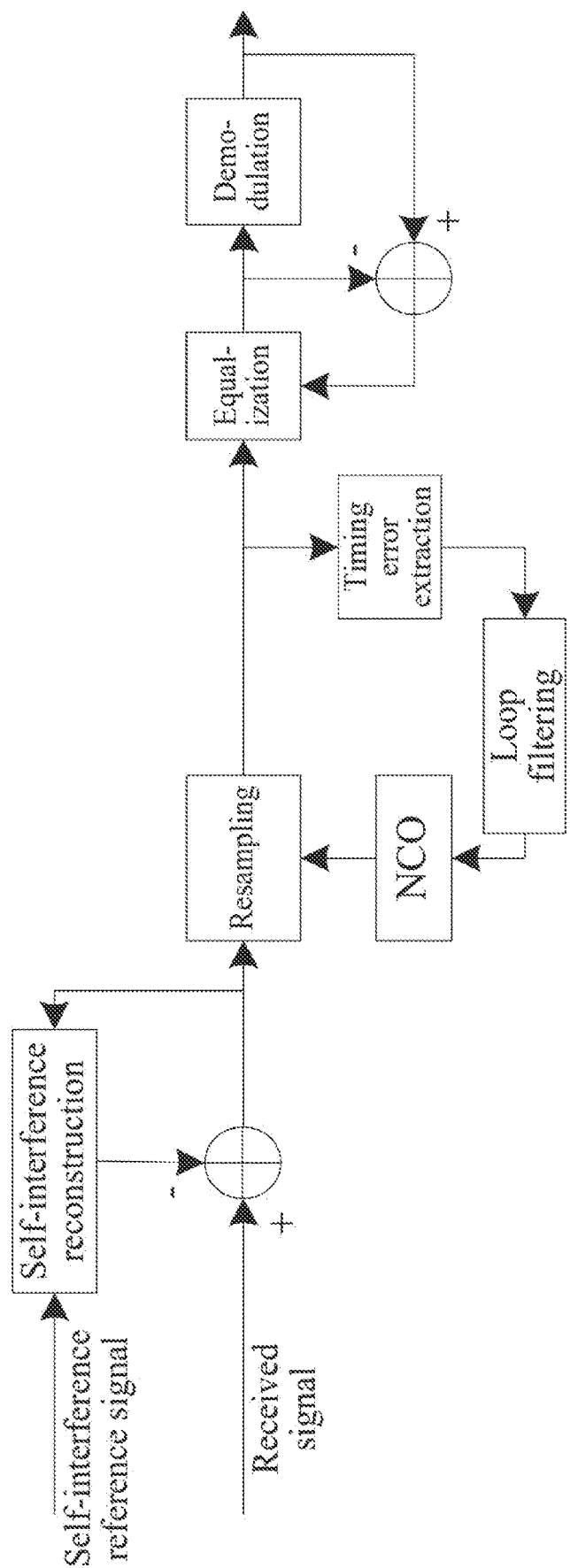
FIG. 2 is a block diagram of an existing implementation of CCFD receiving.

An implementation of the primary self-interference cancellation is like that of self-interference cancellation in the existing technical solution in FIG. 2. A self-adaptive algorithm such as LMS, RLS or FBLMS can be used to reconstruct the self-interference. Different from the existing technical solution, the primary self-interference cancellation in the present disclosure does not require a strong self-interference cancellation capability, and the corresponding cancellation result only provides a reference input for timing synchronization and does not serve as an input for equalization and demodulation of the useful signal. Therefore, it is only necessary to ensure that the useful signal is dominant after the primary self-interference cancellation, and the timing synchronization can realize timing recovery at the optimal sampling point of the useful signal, thereby greatly alleviating implementation pressure of the primary self-interference cancellation.

Step 2: A signal is processed by using a timing synchronization loop after the primary self-interference cancellation, the timing recovery is realized at the optimal sampling point of the useful signal through resampling a, and resampling b1 and resampling b2 are controlled after low-pass filtering is performed on the timing error signal in the timing synchronization loop, to recover the optimal sampling points of the useful signal on the self-interference reference signal and the received signal respectively.

The timing synchronization loop of the signal after the primary self-interference cancellation has a similar structure to the timing synchronization loop in the existing technical solution, and includes resampling a, timing error extraction, loop filtering, and processing of NCO. Based on this, the present disclosure performs low-pass filtering with a smaller bandwidth ratio than the loop filtering on the timing error extraction result, and then controls the resampling of the self-interference reference signal and the received signal, namely, resampling b1 and resampling b2, after the processing of NCO. Resampling b1 and resampling b2 have the same timing error source as resampling a, and therefore, can realize the timing recovery at the optimal sampling point of the useful signal. In addition, due to the smoothing effect of the low-pass filtering, the accuracy of timing error information can be improved, thereby improving timing synchronization performance of the self-interference reference signal and the received signal.

The present disclosure can guarantee the convergence characteristics while improving the timing synchronization performance of the self-interference reference signal and the received signal. On one hand, the low-pass filtering is excluded in the timing synchronization loop and does not adversely affect the convergence speed of the loop. On the other hand, after the loop converges, the timing error extraction result tends to be stable, and the resampling processes of the self-interference reference signal and the received signal also converge.

Figure 4:
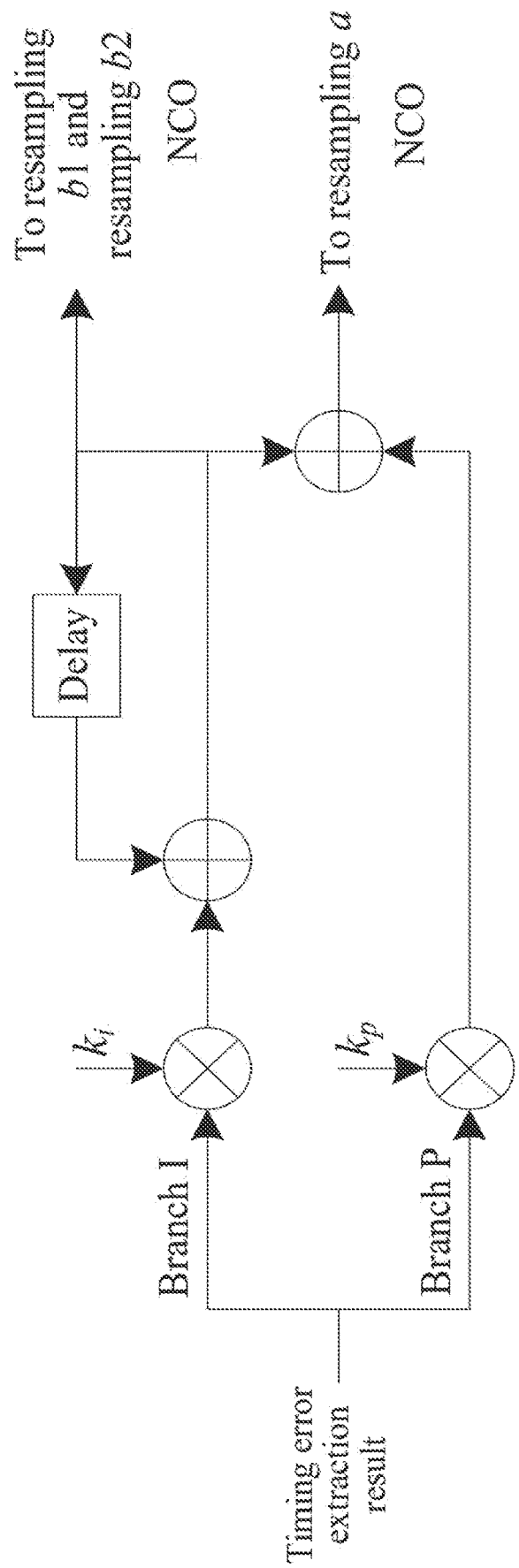
FIG. 4 is a block diagram of an implementation of loop filtering and low-pass filtering in timing synchronization according to the present disclosure.

The loop filtering is generally implemented by a PI control filter. The PI control filter includes branch P sensitive to the input error and branch I insensitive to the input error. Branch P is a proportional link, and branch I is an integral link. A parameter factor $k_i$ of branch I is usually far less than a parameter factor $k_p$ of branch P. Therefore, the passband bandwidth of branch I is far less than that of the loop filter itself, and the low-pass filtering required for the timing synchronization in the present disclosure can be directly provided by branch I of the loop filtering. As shown in FIG. 4, in this way, no additional low-pass filter needs to be built.

Step 3: Joint self-interference cancellation and equalization are performed on the resampled self-interference reference signal and resampled received signal, and the useful signal is received through signal demodulation.

The joint self-interference cancellation and equalization is completed under the driving of the demodulation error and can also be implemented by using a self-adaptive algorithm such as LMS, RLS or FBLMS. Herein, the demodulation error is the decision error, and includes the residual self-interference, equalization error, and noise. After system convergence, these signals are far smaller than the useful signal itself. Theoretically, the self-interference cancellation is not affected by the useful signal, and the cancellation capability can be significantly improved compared with that of the primary self-interference cancellation.

To further explain the effect of the present disclosure compared with the existing solution, performance simulation results are given for a typical scenario. Herein, a classical rummer model including two paths is adopted for channel responses of both the self-interference and the useful signal. The first path is a main path. The delay of the second path relative to the first path is 6.3 ns, and the notch depth is 3 dB, that is, the amplitude of the second path relative to the first path is $1-10^{-3/20}$. The phase of the second path is randomly distributed (the difference between the channel responses of the self-interference and the useful signal is reflected by the phase of the second path). The communication symbol rate is 100 MHz, and the signal is shaped by using a root-raised cosine waveform with roll-off factor of 0.2, in other words, the communication bandwidth is 120 MHz. Both the primary self-interference cancellation and the joint self-interference cancellation and equalization are implemented by using the FBLMS algorithm, and the step size constant of self-adaptive update is $2^{-12}$. In addition, the difference between the clock of the opposite-end device sending the useful signal and that of the local device is 10 ppm. Parameters of the timing synchronization loop filter are set as follows: $k_p=10^{-2}$ and $k_i=10^{-5}$. The low-pass filtering in FIG. 3 is implemented by branch I of the loop filter shown in FIG. 4, and no additional low-pass filter is required.

Figure 5:
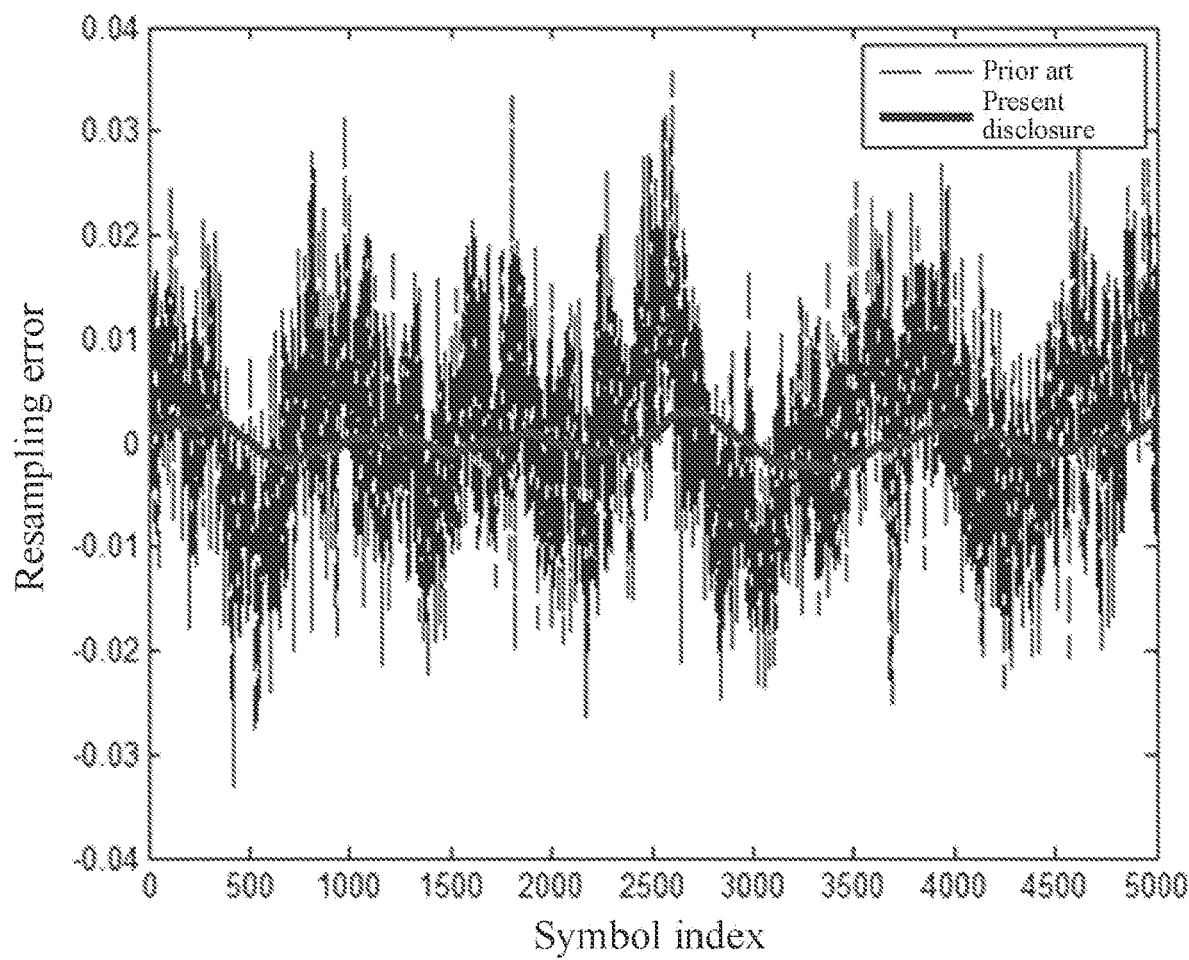
FIG. 5 compares resampling errors of the present disclosure and an existing technical solution.

FIG. 5 compares the resampling errors of the present disclosure and the existing technical solution at the optimal sampling point of the useful signal after the timing synchronization loop converges, where the resampling errors are normalized according to the symbol duration. Herein, the signal-to-interference ratio (SIR) is set to −20 dB, in other words, power of the self-interference is 20 dB greater than that of the useful signal, and the signal-to-noise ratio (SNR) is set to 20 dB. As can be seen from the figure, after the low-pass filtering is performed on the timing error extraction result, the peak resampling error value in the technical solutions of the present disclosure is one order of magnitude lower than that in the existing technical solution, thereby fully ensuring the use of a high-order modulation mode sensitive to the resampling error.

Figure 6:
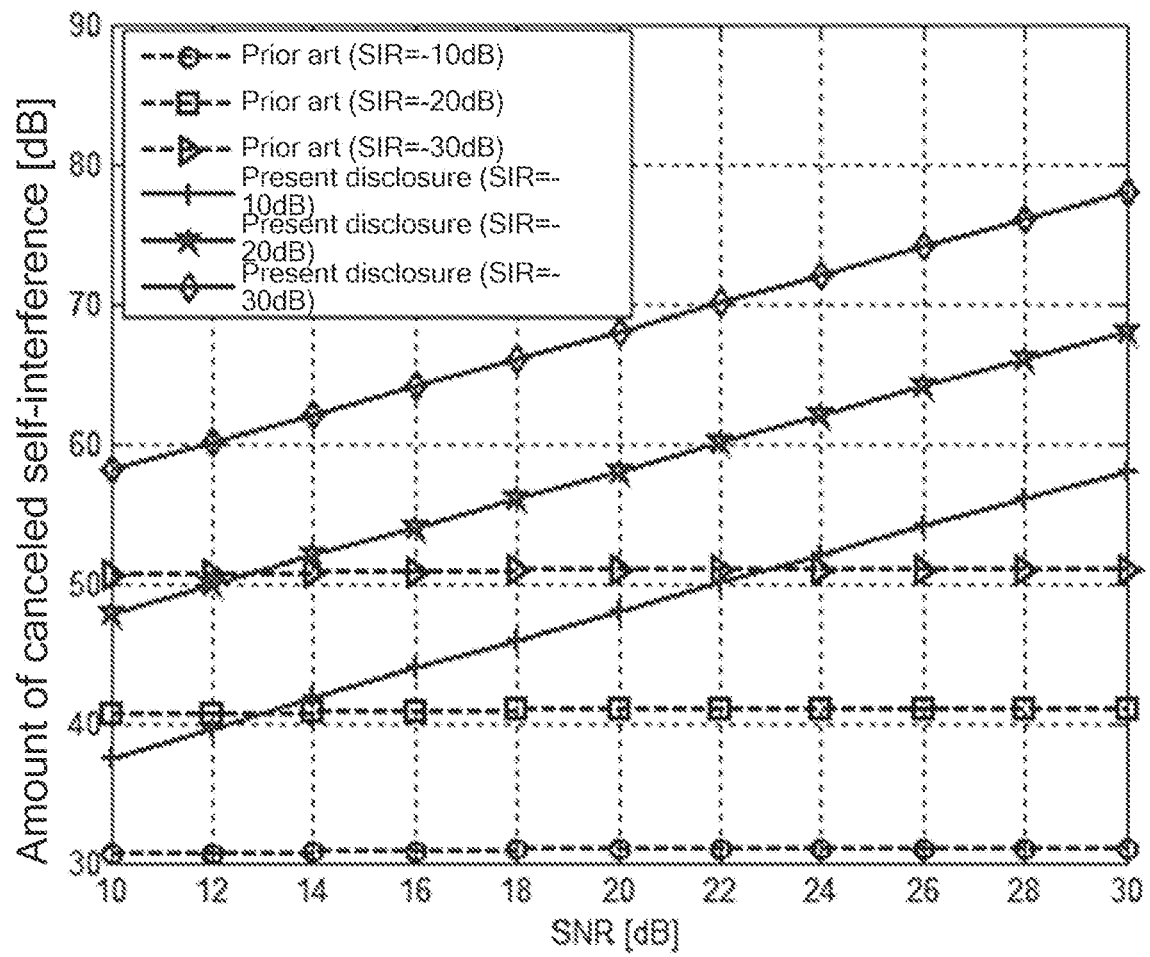
FIG. 6 compares amounts of canceled self-interference in the present disclosure and that in an existing technical solution.

FIG. 6 compares the self-interference cancellation performance of the present disclosure and the existing technical solution. Under different SIRs and SNRs, the power of the self-interference signal and power of the noise can be regarded variable at a fixed power of the useful signal. Since the present disclosure prevents the useful signal affecting the self-interference cancellation, an amount of canceled self-interference in the present disclosure is greater than that in the existing technical solution in all cases. As SNR increases, the amount of the canceled self-interference in the technical solutions of the present disclosure can be continuously increased, because the power of the noise affecting the self-interference cancellation continuously decreases. However, as the SNR increases, the self-interference cancellation capability in the existing technical solution is almost unchanged. In this case, both the useful signal and the noise affect the self-interference cancellation, and the power of the useful signal is much greater than the power of the noise, which is the main factor restricting the self-interference cancellation capability. Although increasing the SNR can reduce the power of the noise, the power of the useful signal does not change. As a result, the self-interference cancellation capability cannot be significantly improved. In addition, in the present disclosure and the existing technical solution, a smaller SIR corresponds to a larger amount of the canceled self-interference, because a smaller SIR corresponds to larger power of the self-interference signal.

Figure 7:
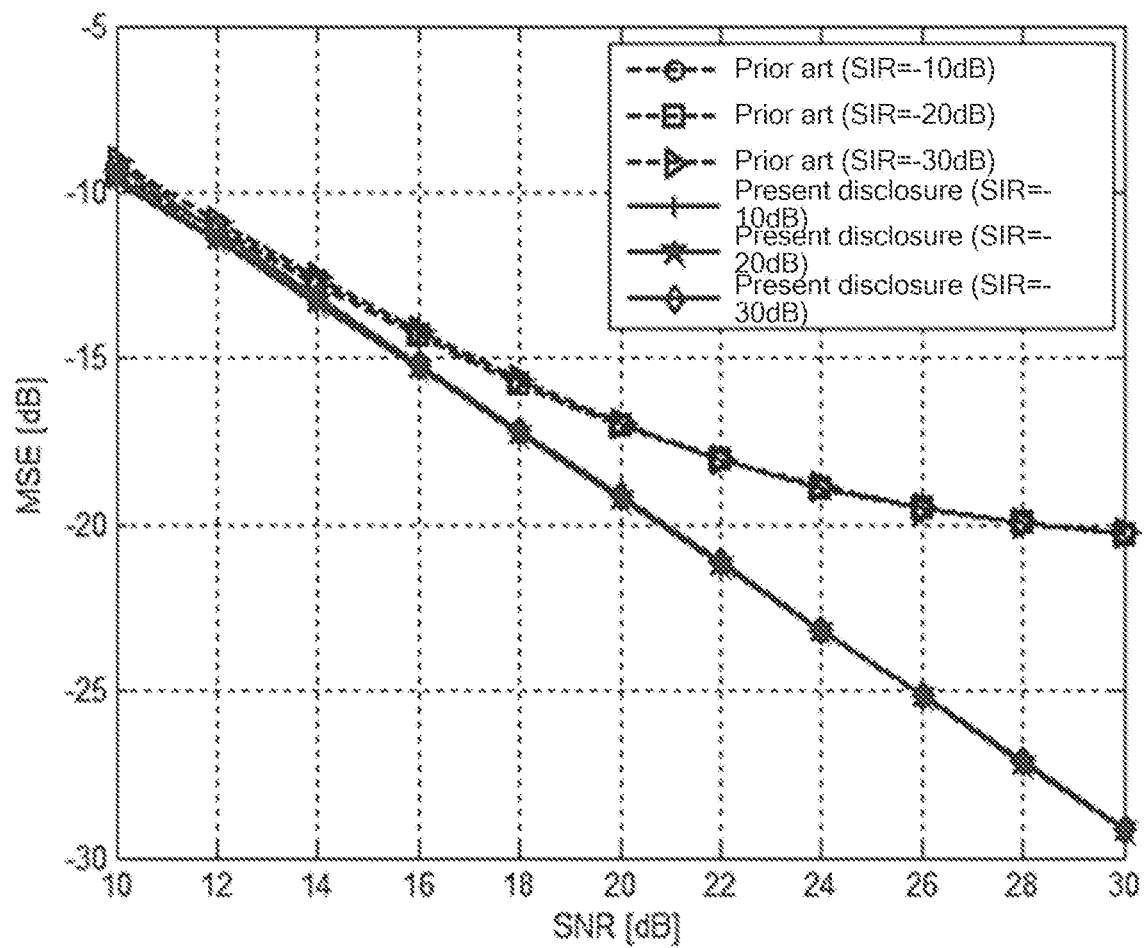
FIG. 7 compares MSEs in the present disclosure and an existing technical solution.

FIG. 7 shows the mean square error (MSE) of demodulating the useful signal in various cases in FIG. 6. The MSE reflects the receiving performance of the useful signal. The MSE in the technical solutions of the present disclosure is less than that in the existing solution in each case, especially when the SNR is large. It can be seen from the figure that the MSE value in units of dB decreases linearly with the increase of SNR, which indicates that the noise is a main factor affecting the MSE. In the technical solutions of the present disclosure, the self-interference is negligible after cancellation. In the existing technical solution, the amount of the canceled self-interference is limited. Especially when the SNR is high, the residual self-interference after the self-interference cancellation is relatively significant relative to the noise, so the MSE decreases slowly in a region with a high SNR. With the change of SIR, the MSEs in the present disclosure and the existing technical solution are less affected. This is because the amount of the canceled self-interference changes for different SIRs and the residual self-interference is almost unchanged.

What is claimed is:
1. A co-frequency co-time full duplex (CCFD) signal receiving method, comprising:
   step 1: taking a sent baseband signal as a self-interference reference signal, reconstructing self-interference self-adaptively, and subtracting the self-interference from a received signal to realize primary self-interference cancellation;
   step 2: processing, by using a timing synchronization loop, a signal after the primary self-interference cancellation, realizing timing recovery at an optimal sampling point of a useful signal through resampling a, and controlling resampling b1 and resampling b2 after performing low-pass filtering on a timing error signal in the timing synchronization loop, to recover optimal sampling points of the self-interference reference signal and the received signal respectively; and
   step 3: performing joint self-interference cancellation and equalization on a resampled self-interference reference signal and a resampled received signal and receiving the useful signal through signal demodulation.

2. The CCFD signal receiving method according to claim 1, wherein the primary self-interference cancellation is performed by using a least mean square (LMS) self-adaptive algorithm, a recursive least square (RLS) self-adaptive algorithm, or a frequency-domain block least mean square (FBLMS) self-adaptive algorithm.

3. The CCFD signal receiving method according to claim 1, wherein the timing synchronization loop comprises the resampling a, timing error extraction, loop filtering, and processing of numerical controlled oscillator (NCO); and a resampled signal is subjected to the timing error extraction to output the timing error signal, and then the timing error signal is fed back to the resampling a after the loop filtering and the processing of NCO.

4. The CCFD signal receiving method according to claim 3, wherein the timing error signal is first smoothed through the low-pass filtering and processed by NCO, and then used to control the resampling b1 on the self-interference reference signal and the resampling b2 on the received signal.

5. The CCFD signal receiving method according to claim 1, wherein the joint self-interference cancellation and equalization is completed under a driving of a demodulation error.

6. The CCFD signal receiving method according to claim 5, wherein the joint self-interference cancellation and equalization is performed by using an LMS self-adaptive algorithm, an RLS self-adaptive algorithm, or an FBLMS self-adaptive algorithm.

7. The CCFD signal receiving method according to claim 5, wherein the demodulation error is a decision error, and comprises residual self-interference, an equalization error, and noise.

\* \* \* \* \*